United States Patent
Kiyomi

(10) Patent No.: US 6,805,556 B2
(45) Date of Patent: Oct. 19, 2004

(54) SILICONE RUBBER RESIN COMPOSITE, METHOD FOR MAKING DENTURES, AND DENTURE COMPRISING THE COMPOSITE MATERIAL

(76) Inventor: Yoshinori Kiyomi, 2-9-7 Mandai, Sumiyoshi-ku, Osaka-shi, Osaka, 558-0055 (JP)

( * ) Notice: Subject to any disclaimer, the term of this patent is extended or adjusted under 35 U.S.C. 154(b) by 57 days.

(21) Appl. No.: 10/303,601

(22) Filed: Nov. 25, 2002

(65) Prior Publication Data

US 2003/0219606 A1 Nov. 27, 2003

Related U.S. Application Data

(60) Provisional application No. 60/382,191, filed on May 21, 2002.

(51) Int. Cl.[7] .......................... A61C 13/07; C08L 83/07; C08G 77/20; B32B 27/00; B32B 15/06
(52) U.S. Cl. ..................... 433/168.1; 428/412; 428/420; 428/447; 428/448; 428/450; 428/523; 528/25; 528/32; 528/33; 524/862; 524/866; 523/120
(58) Field of Search ................................ 524/858, 859, 524/860, 861, 862, 863, 865, 866; 528/25, 32, 33; 427/2.1, 2.29; 428/447, 448, 523, 412, 413, 420, 450; 523/120; 433/168.1

(56) References Cited

U.S. PATENT DOCUMENTS 4,231,917 A * 11/1980 Zeldin et al. ................ 524/650
4,970,245 A * 11/1990 Futami et al. ............... 523/109

FOREIGN PATENT DOCUMENTS

JP 2002-020215 1/2002 ............ A61K/6/00

OTHER PUBLICATIONS

Machine translation of JP 2002–020215, provided by the JPO website.*
Definition of "gel", provided by Polymer Science Dictionary 2nd edition, Mark Alger, 1997.*
The Journal of Dental Technology (vol. 29, No. 12 2001.12).

* cited by examiner

*Primary Examiner*—Philip C. Tucker
*Assistant Examiner*—Michael J Feely
(74) *Attorney, Agent, or Firm*—Darby & Darby

(57) ABSTRACT

The present invention discloses a silicone rubber with improved adhesive properties; a composite structure in which a base member formed from a synthetic resin or metal is bonded firmly and directly to silicone rubber; a denture in which a biocompatible silicone rubber is firmly bonded to a section of a denture bed that contacts the body; and a method for making the denture. Methyl methacrylate is added to a linear polysiloxane and polymerized in a predetermined molding cavity, and methyl polymethacrylate is formed on at least the surface of the molded silicone rubber. The silicone rubber resulting from this process provides superior adhesive properties. A section of a base member, such as a main unit or an auxiliary member of a product, that is to be bonded with silicone rubber is extended into the predetermined molding cavity. The molding cavity is filled with a linear polysiloxane to which a monomer is added. This results in a composite structure in which silicone rubber is bonded to the base member.

19 Claims, 5 Drawing Sheets

SILICONE RUBBER RESIN COMPOSITE, METHOD FOR MAKING DENTURES, AND DENTURE COMPRISING THE COMPOSITE MATERIAL

This application claims the priority of U.S. Provisional Application No. 60/382,191, filed on May 21, 2002 which is hereby incorporated hereby by reference in its entirety.

BACKGROUND OF THE INVENTION

The present invention relates to a silicone rubber that can be bonded directly to synthetic resins or metallic base members; a composite structure in which a silicone rubber and a base member are bonded; a denture integrally lined with silicone rubber on a section of a denture base where it contacts a body; and a method for making a denture.

Denture users experience an extremely unpleasant sensation when they bite hard food. Furthermore, unstable dentures can make eating, talking, and the like difficult. The denture base that presses against the oral cavity mucosa is a hard resin formed from methyl polymethacrylate. Slight gaps form between the denture base and the oral cavity mucosa even if the dentures have been produced using a precise mold formed in the shape of the denture wearer's mouth. The gaps form because of the lack of sufficient precision when making the dentures.

Various types of denture stabilizers have been marketed. A significant number of denture wearers purchase and use denture stabilizers that are applied to the contact surface between the mouth and the denture base. The pain resulting from biting hard food is reduced or eliminated by using these dentures stabilizers, and the dentures are more comfortable to wear. However, these effects last only four or five days at most. This method is expensive and time-consuming for the denture wearer.

Another technique is the adhesion using a solvent of a polyvinyl silicone resin-based liner to the section of the denture base that contacts the body. MOLOPLAST™ from Detax Corp., SOFTLINER™ from GC Corp., and SOFRE-LINER™ from Tokuyama-Dental Corp. are examples of this type of dental technology.

However, the polyvinyl silicone resin-based liner has a Shore hardness of 30–80 and is relatively hard. Pain from biting hard food using dentures with a liner is lower than the pain from biting hard food using dentures with no liner. However, the dentures with a liner are neither comfortable nor stable. Furthermore, the liners described above show rapid discoloration, rapid degeneration, and weak adhesive strength. Thus, the lifespan of the dentures with a liner is a few months to approximately five years and is relatively short. Therefore, the dentures with a liner are expensive for the denture wearer since they must be replaced frequently.

Another type of denture lining is formed with biocompatible silicone rubber, which is used for synthetic biological materials and prosthetics. These dentures are physiologically similar to the oral mucous membrane, reduce the pain from biting hard food, and are not loose. However, there are no adhesives that can bond biocompatible silicone rubber with a denture base of synthetic resin. Sufficient bonding strength and durability is difficult to obtain. Thus, dentures with linings formed with biocompatible silicone rubber, with the exception of the present invention, have not been implemented.

Adhesive agents have been made in which different types of additives are added to silicone gels. However, there is no conventional method for integrally forming a polymer, such as methyl polymethacylate, having good adhesive properties on the surface of silicone rubber.

SUMMARY OF THE INVENTION

The present invention provides a silicone rubber with improved adhesive qualities for denture bases or other base members made of synthetic resin or metal; a composite structure of silicone rubber and a base member in which silicone rubber is bonded firmly to the base member described above; a denture in which silicone rubber serves as a denture liner that is firmly bonded to the denture base; and a method for making dentures in which silicone rubber serves as a denture liner that is firmly bonded to the denture base.

The silicone rubber of the present invention is formed by adding methyl methacrylate to a linear polysiloxane and polymerizing. The linear polysiloxane is expressed by the following chemical equation:

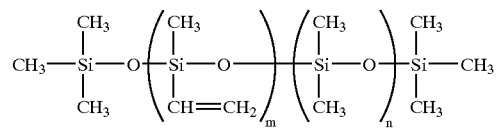

where (m+n=50–2000). Polymerization can be achieved by adding a cross-linking agent such as hydrogen polysiloxane, if necessary.

Silicone-silicone polymerization, silicone-methyl methacrylate polymerization, methyl methacrylate-methyl methacrylate polymerization, and the like take place in the polymerization reaction described above and form a silicone rubber. Methyl polymethacrylate, which adheres strongly to objects, is formed at least on the surface of this silicone rubber. The polymerization reactions can take place in a predetermined container or mold. Alternatively, the reactions can take place in contact with the surface of the synthetic resin or metal base member to which the silicone rubber is to be bonded.

A silicone rubber-base member composite structure according to the present invention is made using a linear polysiloxane as described above. A monomer, such as a methyl methacrylate, is added to the linear polysiloxane described above, and a polymerization reaction takes place with the silicone to form the silicone rubber which is directly bonded to a synthetic resin or metal base member.

A denture according to the present invention includes a denture base, which is the base member in the composite structure described above. A silicone rubber similar to the silicone rubber in the composite structure described above lines a section of the denture base mounted in the body. The silicone rubber can be a biocompatible silicone rubber, and the monomer can be methyl methacrylate.

A method for making dentures according to the present invention includes a method for making dentures in which the silicone rubber described above is bonded to a newly formed denture and a method for making dentures in which the silicone rubber described above is bonded to an existing denture.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
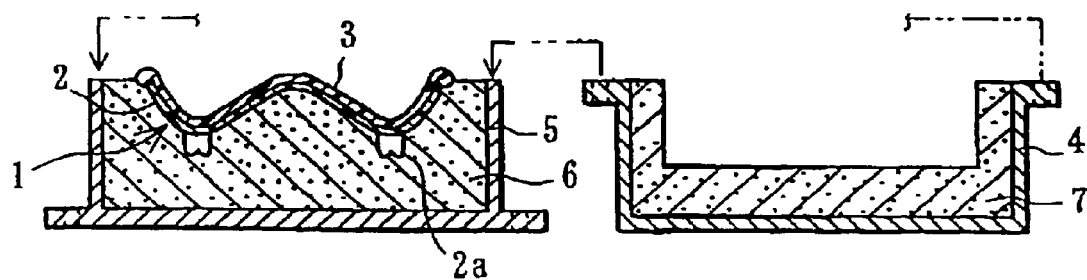
FIG. 1 is a cross-section drawing of a lower flask and an upper flask in which a denture is held in a method for making dentures according to an embodiment of the present invention.

The present invention provides a silicone rubber and a making method thereof.

A linear polysiloxane is represented by the general formula shown in Chemical Formula 1:

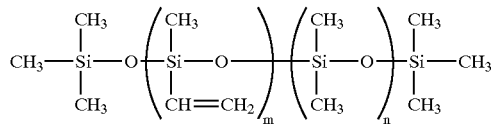

where (m+n=50–2000).

Hydrogen polysiloxane as a cross-linking agent can be represented by the general formula shown in Chemical Formula 2:

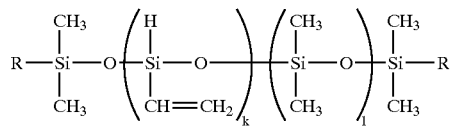

where R is a methyl group or hydrogen and (k+1=8–98).

Hydrogen polysiloxane and methyl methacrylate (MMA) are added to the linear polysiloxane. The hydrogen polysiloxane is 10% by volume relative to the silicone. The MMA is 0.01–0.05% by volume, or preferably 0.015–0.025% by volume, relative to the silicone. The mixture is stirred well and sealed in a polymerization container, e.g., a rectangular container. The mixture is left in the container for approximately 20–30 hours while heated at a low temperature of 500° C. or kept at room temperature.

As a result, a platinum catalyst contained in the silicone serves as the catalyst, and polymerization reactions between silicones take place. The polymerization is accompanied by cross-linking. Additionally, MMA—MMA polymerization reactions take place, and a small amount of polymethyl methacrylate (MMA) is created. Radical polymerization between the silicone and the methyl methacrylate progresses, and a sample piece of soft, elastic silicone rubber is obtained. The methyl methacrylate in the linear polysiloxane is pushed outward so that the polymethyl methacrylate is formed at least on the surface of the silicone rubber.

The silicone used above is Realistic Variable Durometer (A-588), a biocompatible silicone from Dow Corning Corp., U.S., but it would also be possible to use Silskin Clear from Silskin Corp., U.K., or an equivalent biocompatible silicone. A molding cavity having a desired shape can be used instead of a rectangular polymerization container to perform the polymerization reactions. Therefore, the silicone rubber can be molded in the desired shape with polymethyl methacrylate formed on at least the surface. In this case, polymerization can be performed under a predetermined pressure, e.g., 2.5–3.5 atmospheres, and the heating temperature described above can be approximately 50° C.

A separate catalyst is not necessary since the biocompatible silicone contains a platinum catalyst. If the methyl methacrylate added to the silicone is less than 0.01% by volume or exceeds 0.05% by volume, the silicone rubber will not have appropriate characteristics. A cross-linking agent was added for radical polymerization of the silicone and the MMA, but it is possible to cause polymerization between the silicone and the MMA even without the cross-linking agent. Therefore, the cross-linking agent can be omitted if necessary. However, industrial silicone can be used instead of biocompatible silicone. Industrial silicone generally contains an Sn catalyst, and therefore, another catalyst can be added if necessary.

Next, the adhesion strength of the sample pieces of silicone rubber to metal, glass, wood, fabric, and the like is tested. The silicone rubber sample is adhered to a flat, smooth attachment surface of the test material using a cyanoacrylate adhesive. The cyanoacrylate adhesive is a vinyl polymer based thermoplastic resin.

An adhesive formed from a cellulose-based thermoplastic resin adhesive, a polycondensation, a polyaddition adhesive, a thermosetting resin adhesive, or a combination thereof can be substituted for the cyanoacrylate.

The adhesion strength is tested using a tensile test. The silicone rubber sample pieces adhere to the test pieces as follows.

First, dichloromethane is applied to the adhesion surface of the silicone rubber sample piece, and the silicone rubber is left to dry. Then, cyanoacrylate is applied to the silicone rubber. The silicone rubber is pressed against the test piece and left in that state for a period of time. The cyanoacrylate dries, and the pressure on the silicone rubber is released. The silicone rubber sample piece and the test piece adhere firmly to each other and cannot be separated easily. The high adhesion strength is shown when the sample piece breaks as it is pulled away from the test piece with sufficient force.

As a comparative example, the same procedure is performed by adhering test pieces with a silicone rubber formed only with silicone that had been polymerized without adding MMA. The resulting adhesion strength is weak, and the silicone rubber can be peeled easily from surfaces of metal, glass, wood, and fabric.

Thus, silicone rubber can adhere strongly to different materials such as metal, glass, wood, and fabric when it is formed by adding a small amount of MMA and polymerizing as in the present invention. Extremely good adhesive properties are provided.

The reason for this is not completely clear at the moment. However, it is believed that polymerization takes place with MMA, which does not get mixed uniformly in the silicone, being pushed outward during the polymerization process between silicone and MMA. As a result, by MMA—MMA polymerization, PMMA resin is formed at least on the surface of the silicone rubber sample piece, resulting in a dramatic improvement in adhesion to different types of test materials.

During the polymerization of linear polysiloxane to which methyl methacrylate has been added, silicone and methyl methacrylate are polymerized as well. Silicone-MMA polymerization generates a chemical bonding force between the silicone rubber and polymethyl methacrylate. Therefore, the PMMA resin on the surface of the silicone rubber sample piece cannot peel away from the silicone rubber.

The silicone rubber of the present invention has a Shore hardness of 15–20, a tensile elongation of 700%, and a maximum temperature of 260° C. The characteristics of conventional biocompatible silicone rubber, such as elasticity, hardness, and biocompatibility, are maintained. These characteristics and the strong adhesion properties allow the silicone rubber of the present invention to be used in various industrial products such as those shown in FIGS. 9–16.

Figure 9:
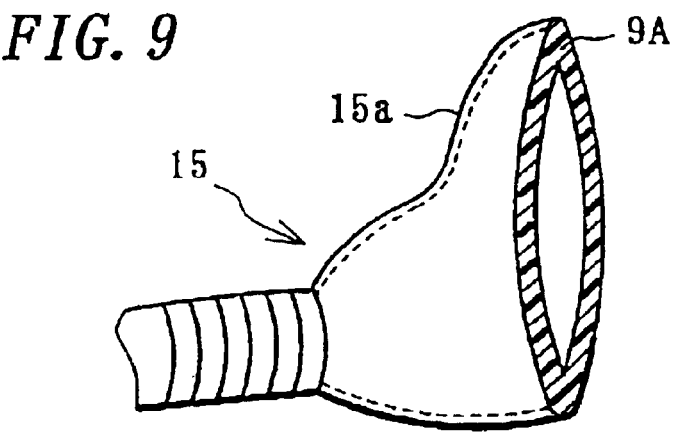
FIG. 9 is an external view of silicone rubber adhered to the end of an activator of a resuscitator according to an embodiment of the present invention.
Figure 10:
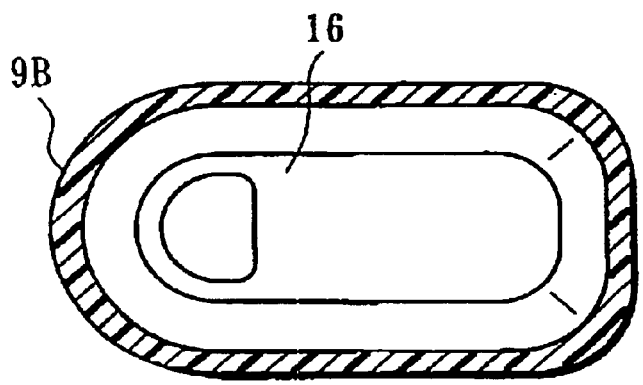
FIG. 10 is a plan view of a toilet for the elderly or infirm on which silicone rubber is adhered according to an embodiment of the present invention.
Figure 11:
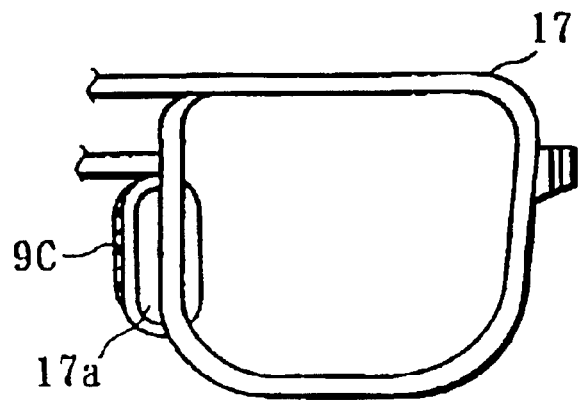
FIG. 11 is a simplified front view of glasses with silicone rubber adhered to a nose support according to an embodiment of the present invention.
Figure 12:
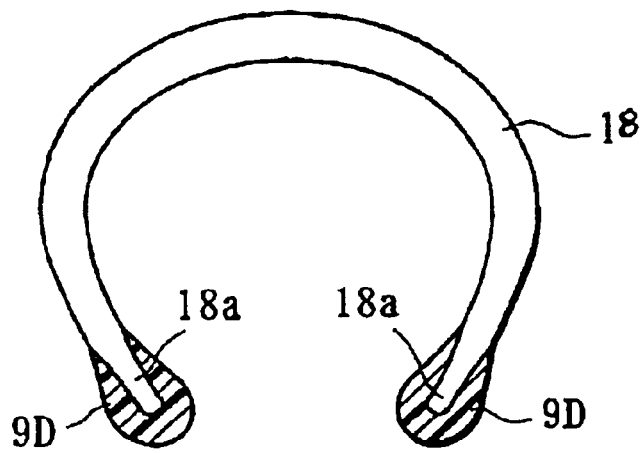
FIG. 12 is a plan view of a hair band in which silicone rubber is adhered to the two ends according to an embodiment of the present invention.
Figure 13:
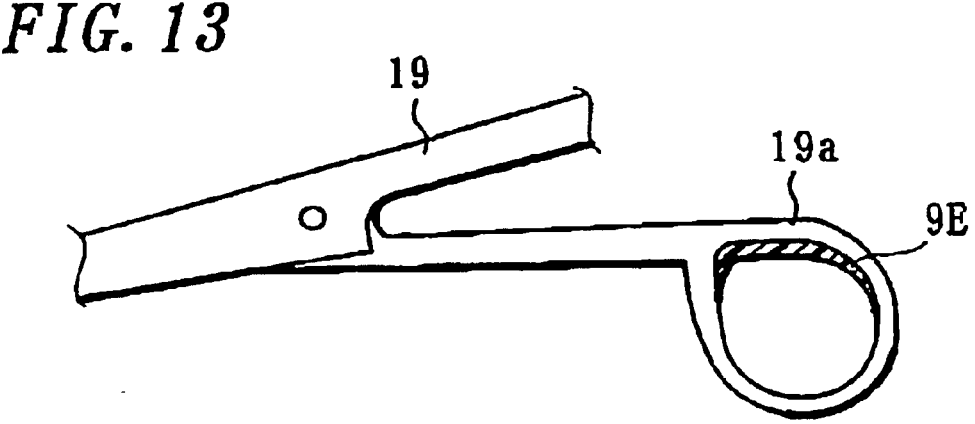
FIG. 13 is a simplified plan view of scissors on which silicone rubber is adhered according to an embodiment of the present invention.
Figure 14:
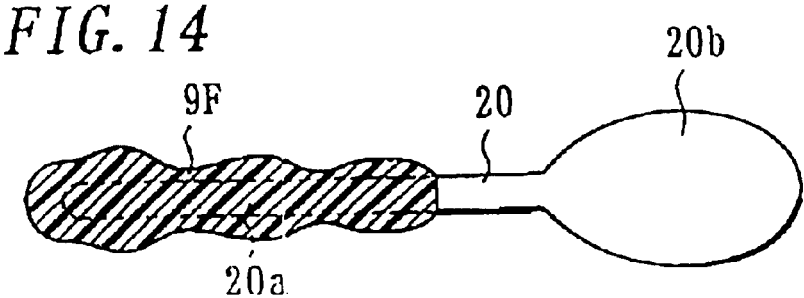
FIG. 14 is a plan view of a spoon on which silicone rubber is adhered according to an embodiment of the present invention.
Figure 15:
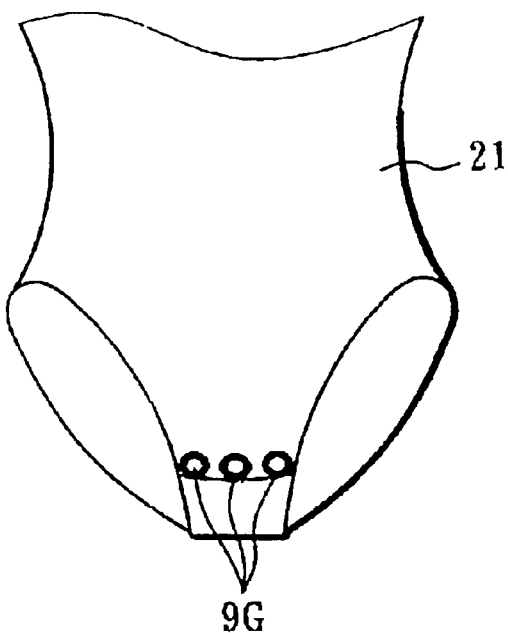
FIG. 15 is a simplified plan view of a bodysuit on which silicone rubber is adhered according to an embodiment of the present invention.
Figure 16:
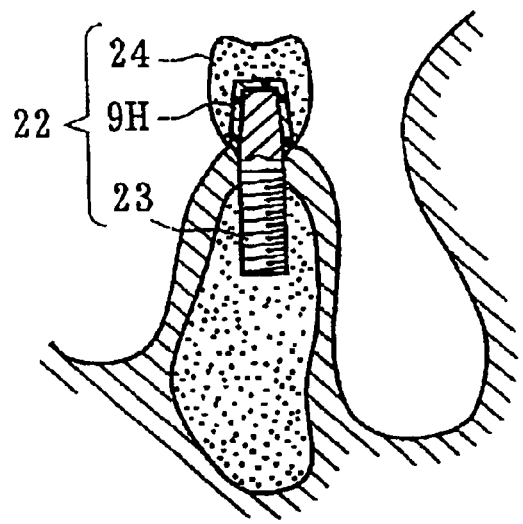
FIG. 16 is a cross-section drawing showing an implant on which silicone rubber is mounted and the area surrounding the implant.

FIG. 9 shows a silicone rubber 9A adhered to a synthetic resin activator 15a of a resuscitator 15. The silicone rubber 9A is adhered to the end of the synthetic resin activator 15a. A silicone rubber film 9B shown in FIG. 10 is adhered to the surface of a toilet seat of a toilet 16 for the elderly or infirm. The toilet 16 is formed from vinyl chloride or the like. A silicone rubber 9C shown in FIG. 11 is adhered to the surface of a synthetic resin nose support 17a and ear supports (not shown) of glasses 17. FIG. 12 shows a silicone rubber 9D adhered to ends 18a of a hair band 18. The silicone rubber 9D is secured to either side of the ends 18a. FIG. 13 shows a silicone rubber 9E adhered to a loop 19a through which a finger is inserted in metal scissors 19. A silicone rubber 9F shown in FIG. 14 is adhered to a grip 20a of a spoon 20. A silicone rubber 9G shown in FIG. 15 is adhered to the inside of a bodysuit 21. A silicone rubber 9H shown in FIG. 16 having a thickness of 0.5–1.0 mm is mounted on an implant 22. The silicone rubber 9H serves as a shock absorber between the denture 24 and the implant body 23 that is screwed into the jaw. The silicone rubber 9H can be formed integrally on the denture 24 and can be adhered to the implant body 23 with an adhesive. The silicone rubber 9A–9H shown in FIGS. 9–16 are a biocompatible silicone rubber.

The products 15–21 shown in FIGS. 9–15 demonstrate the use of biocompatible silicone rubber 9A–9G at sections that directly contact human skin. The biocompatible silicone rubber 9A–9G provides comfort and a pleasant feel by eliminating extreme loads and stimuli on the skin. Products in which linings are formed with silicone rubber 9A–9G at sections that come into contact with human skin are not restricted to those shown in FIGS. 9–15. Linings made of the silicone rubber described above can be used in products for different types of applications that contact the body such as prosthesis, epithesis, full dentures, partial dentures, implants, medical instruments, products involved in elderly or infirm care, baby products, and other products used daily.

The molded silicone rubber 9A–9H shown in FIGS. 9–16 are bonded using adhesives to the surface of various products. Additionally, composite structures with silicone rubber can be produced. The composite structures include a base member having a main unit or an auxiliary member of an industrial product. The base member is bonded integrally with a lining formed from a silicone rubber similar to the silicone rubber described above.

The composite structure is produced using a mold prepared for molding the silicone rubber into a desired shape. The section of the base member described above to which the silicone rubber lining is to be bonded is positioned so that it extends into the mold cavity. Next, a small amount of a monomer that generates a polymerization reaction with silicone is added to a linear polysiloxane similar to the linear polysiloxane described above. The cavity is filled with the linear polysiloxane and a polymerization reaction takes place as described above. Additionally, a cross-linking agent can be added to the linear polysiloxane if necessary. A composite structure of silicone rubber and a base member is formed, and the molded silicone rubber is integrally bonded to the surface of the base member.

The base member can be formed from a synthetic resin such as PMMA, polycarbonate, hard silicone, and a synthetic resin in which the constitutional repeating unit is a condensed ether of bisphenol A and bisphenol S. However, the base member can be formed from a material such as metal or ceramic instead of the synthetic resin. However, if the material for the base member is a synthetic resin, the monomer can be a monomer containing a carbon group such as an epoxy-based monomer, a vinyl-based monomer, a methyl methacrylate, or the like. Alternatively, if the base member is formed from metal or ceramic, the monomer can be a monomer containing a silicon functional group such as an ethoxy-based monomer or a methoxy-based monomer. The preferred ratio of the monomer, which is added to the silicone, is less than 1.0% by volume.

The monomer is not restricted to these examples. Biocompatible silicone rubber is preferred if the silicone rubber lining is to be formed on a section of a base member that contacts the body. However, industrial silicone rubber can be used if the lining is to be formed on areas that did not contact the body.

Additionally, the present invention provides dentures in which the denture base is lined with silicone rubber and a method for making the same.

Silicone rubber is used to line an existing complete denture 1 for upper teeth as shown in FIGS. 1–4. The existing denture 1 is equipped with a denture base 2, corresponding to the base member, formed from methyl polymethacrylate (PMMA) and a plurality of upper teeth 2a as shown in FIG. 1. Approximately the entire surface of the section of the denture base 2 of the denture 1 that contacts the body, i.e., roughly the entire upper surface, is cut to the thickness of the silicone rubber lining prior to setting the denture 1 in a lower flask 5. The thickness of the silicone rubber used for lining is in the range of 0.1–2.0 mm.

Paraffin wax 3 is applied over the entire upper surface of the denture base 2 in order to embed the section of the denture base 2 that is cut. Next, as shown in FIG. 1, the denture 1 is secured in the lower flask 5 with a plaster 6 so as to expose the application surface of the paraffin wax 3.

Figure 2:
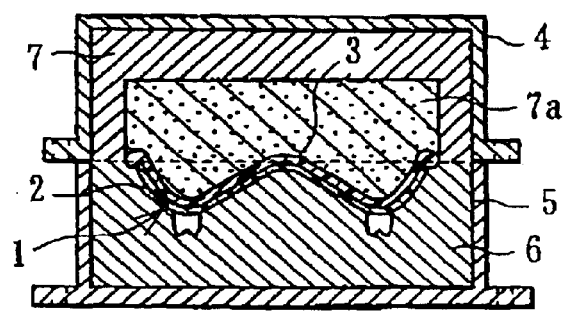
FIG. 2 is a cross-section drawing of a lower flask and an upper flask holding a denture according to an embodiment of the present invention.

An upper mold is formed by pouring plaster 7a into the upper space, including the application surface of the paraffin wax 3 as shown in FIG. 2. At the same time, an upper flask 4 is used to cover the lower flask 5. Lower plaster 7 has been set ahead of time in the upper flask 4. Additional plaster 7a is poured in, if necessary. This is set aside for a period of time so that the plaster 7a can set completely.

Figure 3:
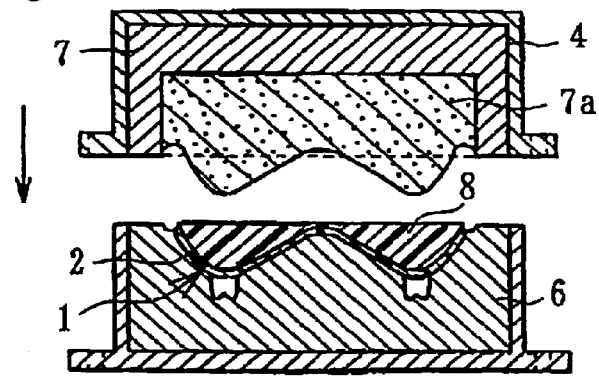
FIG. 3 is a cross-section drawing of a lower flask and an upper flask in which an upper surface side of a denture is filled with linear polysiloxane according to an embodiment of the present invention.

Next, the upper and lower flasks 4, 5 are split, and a suitable solvent is used to wash away and remove the paraffin wax 3 on the upper surface of the denture base 2 as shown in FIG. 3. The space from which the paraffin wax 3 is eliminated forms a molding cavity for the silicone rubber with a corresponding shape when the upper and lower flasks 4, 5 are closed. Next, the section of the upper surface of the denture base from which the paraffin wax 3 was removed is treated with dichloromethane and dried. The surface on which the silicone rubber is formed is a rough surface that is slightly dissolved.

Figure 4:
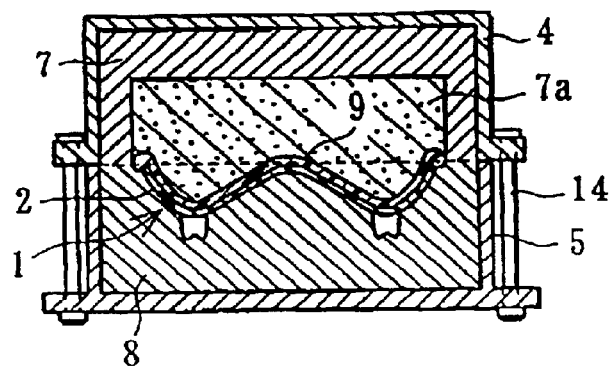
FIG. 4 is a drawing of a lower flask and an upper flask in which silicone rubber lines a denture according to an embodiment of the present invention.

Next, hydrogen polysiloxane, which is 10% by volume relative to the silicone, serves as a cross-linking agent, and MMA, which is 0.015–0.025% by volume relative to the silicone, serves as a monomer for polymerizing with silicone. The hydrogen polysiloxane and MMA are added to and mixed in with biocompatible linear polysiloxane prepared in the same manner as the silicone rubber test pieces described above. The mixture forms a linear polysiloxane 8. The linear polysiloxane 8 fills or coats the denture base 2 from above. Then, the upper flask 4 is placed on top and secured with a bolt 14. The molding cavity is sealed as shown in FIG. 4. The upper and lower flasks 4, 5 are placed in a pressure vessel (not shown), and a low heat of approximately 50° C. is applied for 24 hours at a pressure of approximately 2.5–3.5 atmospheres. This causes polymerization in the silicone 8 with the MMA and the cross-linking agent, and the polymerization takes place inside the molding cavity from which the paraffin wax 3 was removed. A flexible silicone rubber 9 is formed in the molding cavity after setting.

Next, the upper and lower flasks 4, 5 are opened. The denture 1 is removed from the plaster 6, and burrs and the like are removed. If a small, localized gap is formed at the joining surface between the silicone rubber 9 and the denture base 2, a cyanoacrylate adhesive is poured into the gap. The resulting denture 1 is lined with a silicone rubber 9 approximately over the entire surface that contacts the body, and the silicone rubber 9 has a predetermined thickness.

In the polymerization in the molding cavity, silicone-silicone polymerization, MMA-MMA polymerization, and silicone-MMA polymerization occur. Near the surface of the molded silicone rubber, PMMA is generated by the MMA-MMA polymerization, and therefore, the PMMA, on or near the surface, is bonded firmly with PMMA material constituting the denture base 2, and that PMMA, on or near the surface, is bonded firmly with the molded silicone rubber. Thus, the silicone rubber lining is bonded strongly to the entire surface of the section of the denture base 2 that contacts the oral mucosa membrane.

Thus, the MMA near the surface polymerizes when polymerization takes place in the silicone 8 which contains a small amount of MMA. It is believed that the methyl groups, formed by the polymerization, on the PMMA layer of the surface of the silicone rubber 9 engage in a Van der Waals interaction with the methyl groups in the PMMA resin in the denture base 2. The resulting silicone rubber 9 can bond firmly with the denture base 2 even without the use of an adhesive.

The silicone rubber 9 lining the denture base 2 has characteristics similar to the characteristics of the sample silicone rubber pieces described above.

The upper and lower flasks 4, 5 are closed after the linear polysiloxane is injected. However, it would also be possible to close the upper and lower flasks 4, 5 before the linear polysiloxane is injected. The linear polysiloxane, formed by adding MMA and a cross-linking agent and mixing, can be injected into the molding cavity afterwards.

The above method describes an example in which silicone rubber is used to line an existing denture 1. If silicone rubber lines a newly formed denture, then the denture base is formed with a molding cavity for the silicone rubber lining during the production of the denture. The silicone rubber is lined onto the denture base in the same manner as described above.

MMA is used as the monomer, but other monomers that can polymerize with silicone can be used. Furthermore, the denture base 2 of the denture 1 is formed from PMMA resin, but the denture base 2 can be formed from polycarbonate, hard silicone rubber, a synthetic resin in which the constitutional repeating unit is a condensed ether of bisphenol A and bisphenol S, or the like. The embodiment above describes complete dentures, but the present invention can be implemented in a similar manner for partial dentures.

Figure 5:
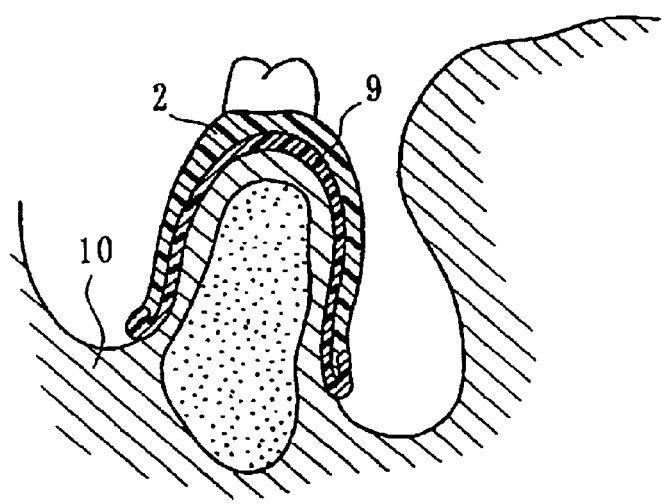
FIG. 5 is a simplified cross-section drawing in which a denture for lower teeth which is lined with silicone rubber is worn in the mouth according to an embodiment of the present invention.
Figure 6:
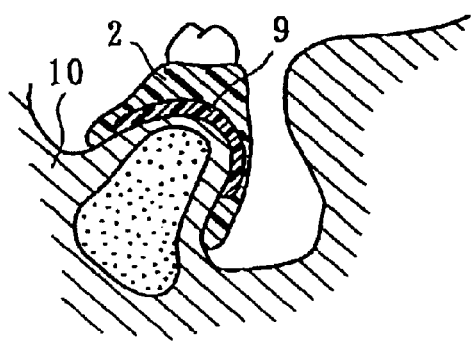
FIG. 6 is a simplified cross-section drawing in which a denture for lower teeth which is lined with silicone rubber is worn in the mouth according to an embodiment of the present invention.
Figure 7:
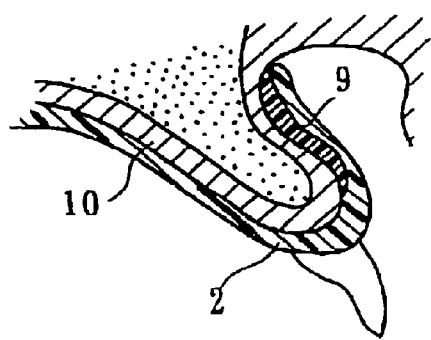
FIG. 7 is a simplified cross-section drawing in which a denture for upper teeth which is lined with silicone rubber is worn in the mouth according to an embodiment of the present invention.

FIGS. 5–8 show dentures worn in the wearers' mouths which were made using methods similar to those described above. FIG. 5 shows the silicone rubber 9 lined on the entire surface of the denture base 2 that contacts the oral cavity mucosa 10. The oral cavity mucosa 10 is the section that directly receives the force of biting. This type of denture is used for teeth that bite hard objects such as lower molars and can significantly reduce the impact transferred to the oral cavity mucosa 10. FIGS. 6–7 show the silicone rubber 9 lining a section of the surface of the denture base that contacts the oral cavity mucosa 10 of the denture base 2. FIG. 6 shows a denture for the lower molars, and FIG. 7 shows a denture for the upper front teeth. A small amount of the silicone rubber 9 is sufficient for these dentures to reduce the impact transferred to the oral cavity mucosa 10. Therefore, denture production costs are reduced.

Figure 8:
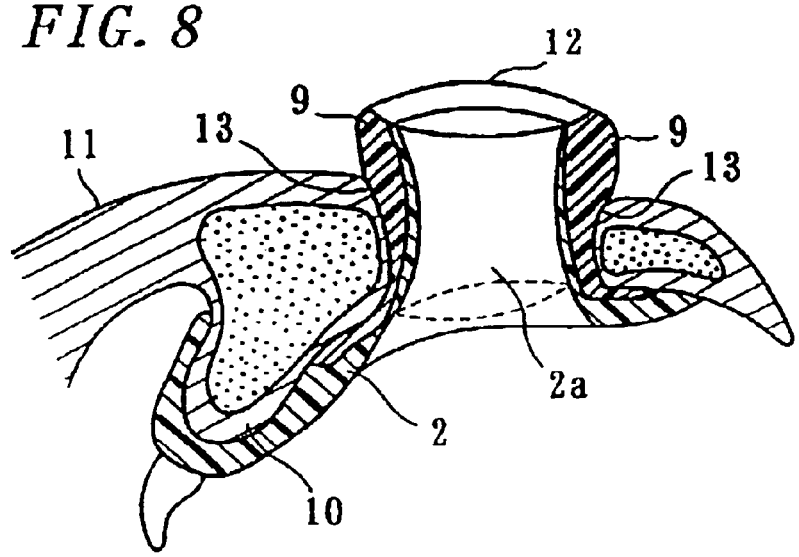
FIG. 8 is a simplified cross-section drawing in which a specially structured denture which is lined with silicone rubber is worn according to an embodiment of the present invention.

Furthermore, FIG. 8 shows a special denture in which a section of a maxillary sinus 11 is continuous with a nasal cavity 12 due to a palate laceration. The silicone rubber 9 is used to provide localized lining around an insertion section 2a of the denture base 2 formed for insertion into the damaged area 13. The flexible silicone rubber 9 completely seals the damaged area 13 so that there are no gaps. This prevents air leakage and preserves the clarity of pronunciation while also preventing drinks and the like from flowing into the nasal cavity 12.

A denture with a lining of flexible silicone rubber can be manufactured easily. The lining covers roughly the entire surface of the dental bed (denture base) where it contacts the body. The shock absorbing effect of the dentures significantly reduces the impact resulting from biting a hard object while wearing these dentures. The dentures can be worn comfortably with almost no pain involved and can last for a long period of time of approximately 10–15 years.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A silicone rubber, said silicone rubber comprising:
   methyl methacrylate added to a linear polysiloxane;
   said methyl methacrylate and said linear polysiloxane have been polymerized; and
   said linear polysiloxane having a formula:

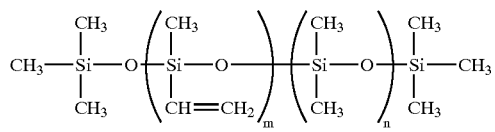

where(m+n50–2000).

2. A silicone rubber as described in claim 1 wherein silicone-silicone polymerization, methyl methacrylate-methyl methacrylate polymerization, and silicon-methyl methacrylate polymerization are performed.

3. A silicone rubber as described in claim 1 wherein the proportion of said methyl methacrylate relative to said silicone is 0.01–0.05% by volume.

4. A silicone rubber as described in claim 1 wherein said silicone is biocompatible silicone.

5. A silicone rubber as described in claim 1 wherein at least said methyl methacrylate is added to said silicone and placed in a molding cavity of a mold and polymerized, methyl polymethacrylate being formed at least on a surface section of a molded product.

6. A silicone rubber as described in claim 5 wherein said silicone is a biocompatible silicone bonded via said methyl polymethacrylate on said surface section to all or part of where a synthetic resin denture base contacts a body.

7. A silicone rubber, said silicone rubber comprising:
   a cross-linking agent and methyl methacrylate added to a linear polysiloxane;
   said cross-linking agent, said liner polysiloxane and said methyl methacrylate have been polymerized; and
   said linear polysiloxane having a formula:

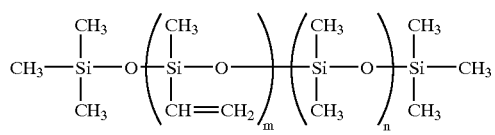

where(m+n=50–2000).

8. A silicone rubber-base member composite structure, said silicone rubber-base member composite structure comprising:
   a base member and a silicone rubber directly bonded together;
   said base member comprising a synthetic resin;
   said silicone rubber is formed by adding a monomer that generates a polymerization reaction with silicone to a linear polysiloxane; and
   said linear polysiloxane having a formula:

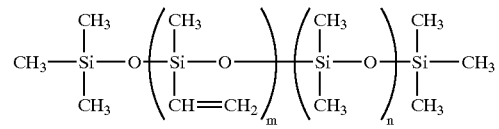

where (m+n=50–2000).

9. A silicone rubber-base member composite structure as described in claim 8 wherein:
   said monomer is methyl methacrylate that results in a radical polymerization reaction with said silicone; and
   methyl polymethacrylate is formed on said silicone rubber at a surface section thereof that bonds with said base member.

10. A silicone rubber-base member composite structure as described in claim 9 wherein said silicone rubber is bonded to said base member by said methyl polymethacrylate.

11. A silicone rubber-base member composite structure as described in claim 8 wherein said synthetic resin in said base member is methyl polymethacrylate, polycarbonate, hard silicone rubber, or a second synthetic resin, said second synthetic resin comprising a constitutional repeating unit which is a condensed ether of bisphenol A and bisphenol S.

12. A silicone rubber-base member composite structure as described in claim 11 wherein said silicone rubber is a biocompatible silicone rubber.

13. A silicone rubber-base member composite structure as described in claim 12 wherein:
   said silicone rubber-base member composite structure is worn on the body; and
   said silicone rubber is placed on all or part of a section of said silicone rubber-base member composite structure worn on the body.

14. A silicone rubber-base member composite structure as described in claim 13 wherein said base member is a denture base, a prosthesis, or an epithesis.

15. A silicone rubber-base member composite structure wherein:
   a metal base member is directly bonded with a silicone rubber;
   said silicone rubber is formed by adding a monomer that generates a polymerization reaction with silicone to a linear polysiloxane; and
   said linear polysiloxane having a formula:

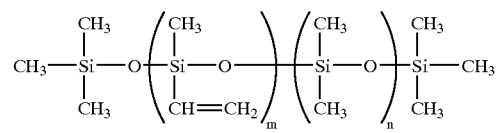

where (m+n=50–2000).

16. A silicone rubber-base member composite structure as described in claim 15 wherein:
   said monomer is methyl methacrylate that results in a radical polymerization reaction with said silicone; and
   methyl polymethacrylate is formed on a surface section of said silicone rubber that bonds with said base member.

17. A denture, said denture comprising:

a denture base worn on a body and silicone rubber lining all or part of a section of said denture base, wherein said silicone rubber is formed by adding a monomer that generates a polymerization reaction with silicone to a linear polysiloxane, said linear polysiloxane having a formula

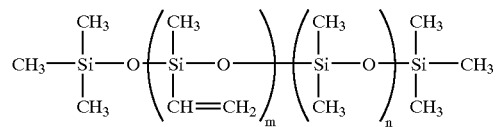

where (m+n=50–2000).

18. A denture as described in claim 17 wherein:

said monomer is methyl methacrylate that results in a radical polymerization reaction with said silicone; and methyl polymethacrylate is formed on said silicone rubber at a surface section thereof that bonds with said base member.

19. A denture as described in claim 17 wherein said denture base is formed from methyl polymethacrylate, polycarbonate, hard silicone rubber, or a synthetic resin in which a constitutional repeating unit is a condensed ether of bisphenol A and bisphenol S.

* * * * *

UNITED STATES PATENT AND TRADEMARK OFFICE
CERTIFICATE OF CORRECTION

PATENT NO. : 6,805,556 B2
APPLICATION NO. : 10/303601
DATED : October 19, 2004
INVENTOR(S) : Yoshinori Kiyomi It is certified that error appears in the above-identified patent and that said Letters Patent is hereby corrected as shown below:

In the Claims:

Column 9, Line 26, Please delete "(m+n50-2000)." and substitute

-- (m+n=50-2000) --.

Signed and Sealed this

Ninth Day of January, 2007

JON W. DUDAS
*Director of the United States Patent and Trademark Office*